US012530256B2

(12) United States Patent
Srinivasan et al.

(10) Patent No.: US 12,530,256 B2
(45) Date of Patent: Jan. 20, 2026

(54) SYSTEMS AND METHODS FOR IN-SYSTEM DETECTION AND RECOVERY OF A BIT CORRUPTION EVENT

(71) Applicant: QUALCOMM INCORPORATED, San Diego, CA (US)

(72) Inventors: Dharani Kumar Srinivasan, Chennai (IN); Praveen Raghuraman, Chennai (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/613,031

(22) Filed: Mar. 21, 2024

(65) Prior Publication Data

US 2025/0298686 A1   Sep. 25, 2025

(51) Int. Cl.
*G06F 11/07* (2006.01)
*G06F 11/14* (2006.01)

(52) U.S. Cl.
CPC ........ *G06F 11/0793* (2013.01); *G06F 11/076* (2013.01); *G06F 11/1438* (2013.01); *G06F 11/1441* (2013.01); *G06F 11/0736* (2013.01)

(58) Field of Classification Search
CPC ............... G06F 11/0736; G06F 11/076; G06F 11/0793; G06F 11/1438; G06F 11/1441; G06F 1/30; G06F 1/305
See application file for complete search history.

(56) References Cited

U.S. PATENT DOCUMENTS

| 2007/0011513 A1* | 1/2007 | Biswas ............... G06F 11/1008 714/E11.034 |
| 2011/0219274 A1* | 9/2011 | Cho ...................... G11C 29/52 714/708 |
| 2012/0311374 A1* | 12/2012 | Felix ..................... G06F 1/3203 714/2 |
| 2013/0235644 A1* | 9/2013 | Chung ................... G11C 17/16 365/103 |
| 2016/0225436 A1* | 8/2016 | Wang .................... G06F 11/073 |
| 2016/0239376 A1* | 8/2016 | Demay ............. G01R 31/2851 |
| 2017/0046219 A1* | 2/2017 | Krishnappa ............ H03M 13/11 |
| 2019/0102088 A1* | 4/2019 | Fang ................... G06F 12/0246 |

\* cited by examiner

*Primary Examiner* — Marc Duncan
*Assistant Examiner* — Albert Li
(74) *Attorney, Agent, or Firm* — Smith, Tempel, Blaha LLC (57) ABSTRACT

Systems and methods for in-system, self-recovery (ISSR) in a system-on-a-chip (SoC) are disclosed for detecting and recovering from a bit corruption event that has caused an SoC subsystem to crash. If a bit flip event is detected through observation of a subsystem crash, ISSR steps are taken in an attempt to correct the issue. If the ISSR steps are successful, then the system is not halted and mission mode operations continue. If the ISSR steps are unsuccessful, then the system is halted and an return material authorization (RMA) can then be issued for return of the failed part to the OEM. Crash events and self-recovery attempts preferably are logged by the ISSR system and provided to the OEM.

16 Claims, 6 Drawing Sheets

SYSTEMS AND METHODS FOR IN-SYSTEM DETECTION AND RECOVERY OF A BIT CORRUPTION EVENT

DESCRIPTION OF THE RELATED ART

A computing device may include multiple processor-based subsystems. Such a computing device may be, for example, a portable computing device ("PCD"), such as a laptop or palmtop computer, a cellular telephone or smartphone, a portable digital assistant, a portable game console, etc. Still other types of PCDs may be included in automotive and Internet-of-Things ("IoT") applications. A computing device may also be a stationary computer, such as a personal computer (PC) or various types of desktop computers or workstation computers.

Such processor-based subsystems may be included within the same integrated circuit chip or in different chips. A "system-on-a-chip", or "SoC", is an example of one such chip that integrates numerous subsystems to provide system-level functionality. For example, a SoC may include one or more types of processors, such as central processing units ("CPU"s), graphics processing units ("GPU"s), digital signal processors ("DSP"s), and neural processing units ("NPU"s). A SoC may include other subsystems as well, such as a transceiver or "modem" subsystem that provides wireless connectivity, a memory subsystem, etc.

SoCs designed for use in automotive systems, high-end edge computing systems and other cutting-edge systems require complex subsystems that are integrated into a single SoC with a small footprint to achieve high performance with low power consumption, Such subsystems require the performance of intensive memory read/write operations, Functionally, the SoC subsystems work on instruction-based operations and the instructions can come from other subsystems of the SoC or they can be read back from memory of the SoC (e.g., cache) for successive execution.

A data corruption event such as a bit flip (a bit that is supposed to be a logic zero changing to a logic one, or vice versa) can potentially lead to incorrect data that causes the system to crash. If this occurs during mission mode, the result can be catastrophic. Currently, there is no mechanism for detecting and resolving the bit flip issue during mission mode. The crash can lead to a return material authorization (RMA) being issued and the SoC or the SoC batch being returned to the original equipment manufacturer (OEM).

A need exists for a way of detecting and resolving a bit flip event that occurs during mission mode.

SUMMARY OF THE DISCLOSURE

Systems, methods, and other examples are disclosed for performing in-system, self-recovery (ISSR) of subsystems of a SoC if a bit corruption event occurs during operations of one of the subsystems.

An exemplary embodiment of the method comprises determining whether a bit corruption event has occurred resulting in one of the subsystems of the SoC crashing; and taking one or more ISSR steps to cause the first subsystem to recover from the crash in response to a determination that a bit corruption event has occurred resulting in a first subsystem of the SoC crashing a first time.

An exemplary embodiment of the system comprises an ISSR engine in communication with the subsystems of the SoC and comprising ISSR decision logic and ISSR recovery logic. The ISSR decision logic is configured to determine whether a bit corruption event has occurred resulting in one of the subsystems of the SoC crashing. The ISSR recovery logic is configured to cause one or more ISSR steps to be taken if a determination is made that a bit corruption event has occurred resulting in a first subsystem of the SoC crashing a first time, wherein said one or more ISSR steps to be taken are intended to recover the first subsystem from the crash.

An exemplary embodiment of a computer readable medium comprises a computer program for execution by the ISSR engine. The computer program comprises first and second sets of computer instructions. The first set of computer instructions causes the ISSR engine to determine whether a bit corruption event has occurred resulting in one of the subsystems of the SoC crashing. The second set of computer instructions cause the ISSR engine to take one or more ISSR steps to cause a first subsystem of the SoC to recover from the crash in response to a determination being made by the first set of computer instructions that a bit corruption event has occurred resulting in a first subsystem of the SoC crashing.

These and other features and advantages will become apparent from the following description, drawings and claims.

BRIEF DESCRIPTION OF THE DRAWINGS

In the Figures, like reference numerals refer to like parts throughout the various views unless otherwise indicated.

DETAILED DESCRIPTION

The present disclosure is directed to systems and methods for detecting and resolving a bit flip event that occurs during mission mode. A flipped bit is a form of silent data corruption. Even though SoCs are fully validated using different platforms, bit flip events do sometimes occur. One of the primary causes of a bit flip event is a disturbance in the supply voltage of the power rail of the memory subsystem of the SoC. Currently, when a bit flip occurs, the subsystem crashes and the SoC system is halted, typically leading to issuance of a RMA and the part being returned to the OEM for debugging, a refund being issued to the customer and/or the part being replaced.

In accordance with the present disclosure, if a bit flip event is detected by observing a subsystem crash, in-system, self-recovery (ISSR) steps are taken to correct the issue. If the ISSR steps are successful, then the system is not halted and mission mode operations continue. If the ISSR steps are unsuccessful, then the system is halted and an RMA can then be issued for return of the failed part to the OEM. Crash events and self-recovery attempts preferably are logged by the ISSR system and provided to the OEM.

A detailed discussion of a representative embodiment of the ISSR system and method is described below with reference to the figures. In the following detailed description, for purposes of explanation and not limitation, exemplary, or representative, embodiments disclosing specific details are set forth to provide a thorough understanding of an embodiment according to the present teachings. The word "exemplary" is used herein to mean "serving as an example, instance, or illustration." The words "illustrative" or "representative" may be used herein synonymously with "exemplary." Any aspect described herein as "exemplary" is not necessarily to be construed as preferred or advantageous over other aspects. However, it will be apparent to one having ordinary skill in the art and having the benefit of the present disclosure that other embodiments according to the present teachings that depart from the specific details disclosed herein remain within the scope of the appended claims. Moreover, descriptions of well-known apparatuses and methods may be omitted to not obscure the description of the example embodiments. Such methods and apparatuses are clearly within the scope of the present teachings.

The terminology used herein is for purposes of describing exemplary or representative embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory device", as that term is used herein, is intended to denote a non-transitory computer-readable storage medium that can store computer instructions, or computer code, for execution by one or more processors. References herein to a "memory device" should be interpreted as including one or more memory devices.

A "processor", as that term is used herein encompasses an electronic component that can execute a computer program or executable computer instructions. References herein to a computer comprising "a processor" should be interpreted as one or more processors. The processor may for instance be a multi-core processor comprising multiple processing cores, each of which may comprise multiple processing stages of a processing pipeline. A processor may also refer to a collection of processors within a single system or distributed amongst multiple systems.

The term "logic", as that term is used herein, denotes digital circuits, such as digital gate structures, that are combined and configured in a particular manner to achieve one or more functions. For example, control logic can be a combination of digital circuits that have been combined and configured in a particular manner to achieve one or more control functions, either solely in hardware or in a combination of hardware, software and/or firmware.

A computing device may include multiple subsystems, cores or other components. Such a computing device may be, for example, a PCD, such as a laptop or palmtop computer, a cellular telephone or smartphone, a portable digital assistant, a portable game console, an automotive safety system, etc., or a non-portable computing device (NPCD) such as, for example, a PC, a desktop or a workstation computer.

Figure 1:
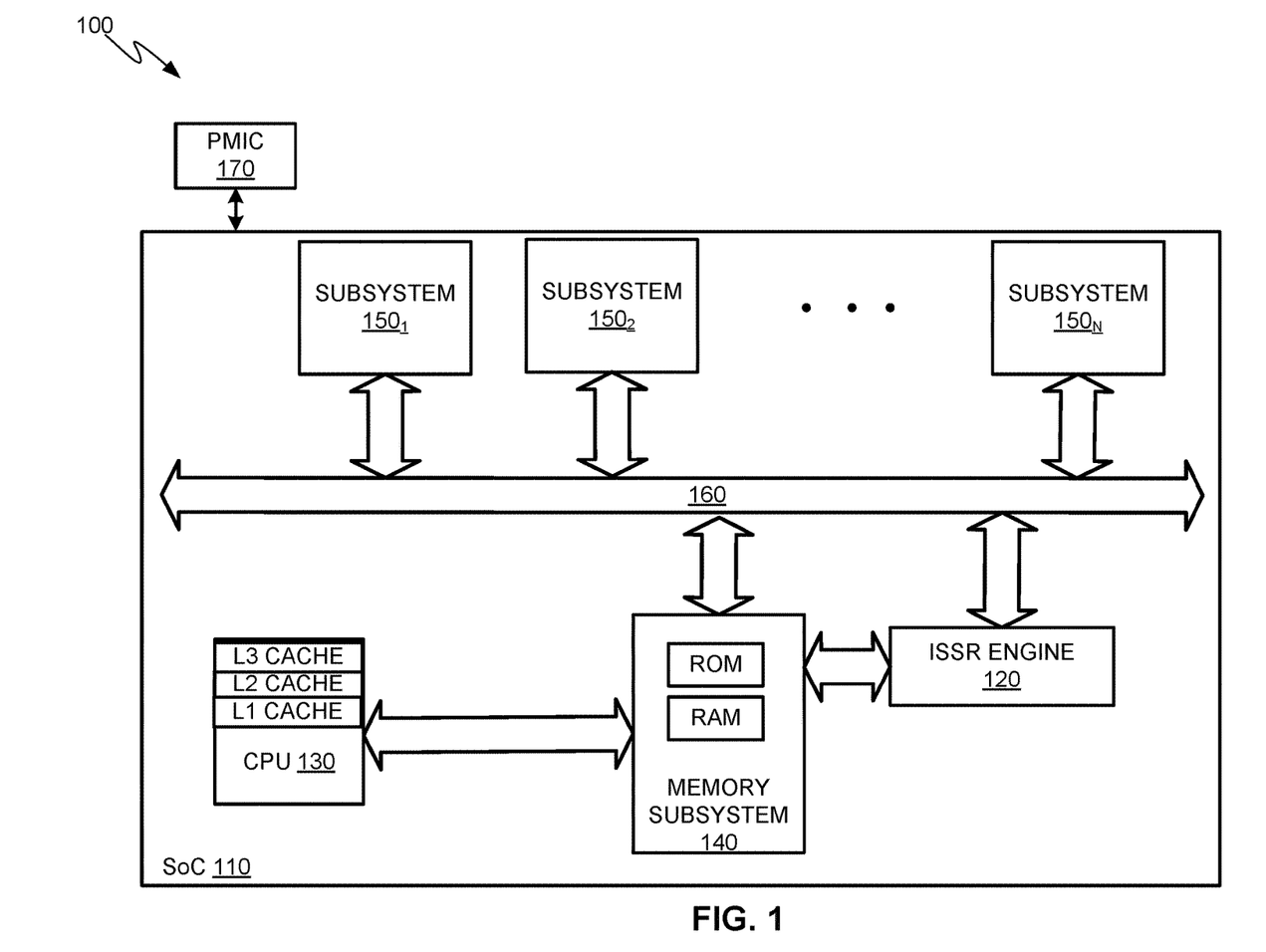
FIG. 1 is a block diagram of an in-system, self-recovery (ISSR) system of an SoC in accordance with a representative embodiment for in-system detection and recovery of bit corruption events.

FIG. 1 illustrates a block diagram of an ISSR system 100 in accordance with a representative embodiment comprising an SoC 110 that is configured to include an ISSR engine 120 that monitors the subsystems of the SoC 110. In accordance with this representative embodiment, the ISSR engine 120 detects if a subsystem crash has occurred due to the occurrence of a bit flip event. If so, the ISSR engine 120 attempts to recover the subsystem. The ISSR engine 120 preferably also logs the occurrence of the bit flip event and provides feedback to the OEM about the occurrence of the bit flip event.

SoCs typically include multiple subsystems such as, for example, a central processing unit (CPU) 130, a memory subsystem 140 and N other subsystems $150_1$-$150_N$, where N is a positive integer that is greater than or equal to one. The subsystems $150_1$-$150_N$ can include, for example, a digital signal processor (DSP), a graphics processing unit (GPU), an analog signal processor, a neural processing unit (NPU), etc. Communications within the SoC 100 typically occur over a system bus 160.

A bit flip event can occur when one of the subsystems of the SoC 110 is reading or writing the memory subsystem 140 or using the memory subsystem 140 to exchange data with another subsystem of the SoC 110. The ISSR engine 120 monitors the performance of the subsystems $150_1$-$150_N$ and detects when any of the subsystems $150_1$-$150_N$ enters a crash state indicating that the subsystem has crashed due to bit flip error in the memory subsystem 140. The ISSR engine 120 then obtains the previous state that the crashed subsystem was in just prior to the crash, which is contained in memory of the memory subsystem 140 or in some other memory location of the SoC 110.

In accordance with an embodiment, the ISSR engine 120 is stand-alone CPU that supports the SoC CPU 130 and is dedicated to tracking and monitoring the status of the subsystems $150_1$-$150_N$. Details of an embodiment of the ISSR engine 120 are described below in more detail with reference to FIG. 6. The ISSR engine 120 preferably resides in a central location within the SoC so that can detect when a subsystem has crashed and view the last memory read or write operation performed by the subsystem to determine whether or not a bit flip event occurred. The ISSR engine 120 comprises logic that knows the correct value of the bit. When the ISSR engine 120 detects that a subsystem has halted, it compares the known or expected bit value with the last bit value written to or read from memory to determine whether a bit flip occurred that caused the subsystem to crash.

The ISSR engine 120 then requests that the power management integrated circuit (PMIC) 170 provide an increased supply voltage for the memory subsystem 140. As will be described below in more detail, the increase in the supply voltage can be an incremental, or stepwise, increase in the supply voltage above the supply voltage that was being used by the memory subsystem 140 when the crash occurred. The ISSR engine 120 then restores the state that the crashed subsystem was in just prior to the state that the crashed subsystem was in when it crashed, allows the operations of the subsystem to resume from the prior state using the increased supply voltage, and observes whether the crash occurs again when using the increased supply voltage.

The process of increasing the supply voltage in a stepwise manner, restoring the previous state of the subsystem (i.e., the state just prior to the crash state), resuming subsystem operations in the previous state, and observing whether the subsystem recovers can occur once or it can be an iterative process performed some predetermined number of times, depending on the manner in which the ISSR engine 120 and method are implemented. If the subsystem fails to recover after one or some predetermined number of recovery attempts, the ISSR engine 120 preferably logs the occurrence of the crash event, the state that the crashed subsystem was in when the crash occurred, the number recovery attempts that were made, and sends feedback to the OEM. The ISSR engine 120 can also cause one or more other actions to be taken.

Figure 2:
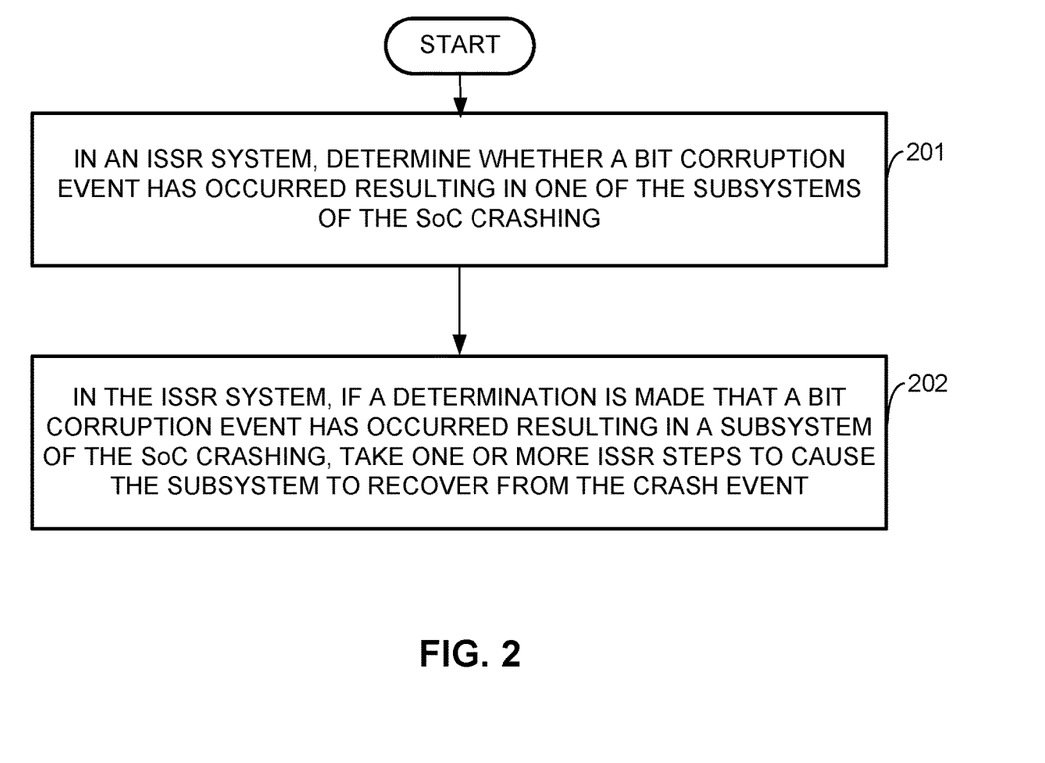
FIG. 2 is a flow diagram depicting the ISSR method in accordance with a representative embodiment.

FIG. 2 is a flow diagram depicting the ISSR method in accordance with a representative embodiment. A first step of the method comprises determining, with an ISSR system, whether a bit corruption event has occurred resulting in one of the subsystems of the SoC crashing, as indicated by block 201. A second step of the method comprises, in the ISSR system, if a determination is made that a bit corruption event has occurred resulting in a first subsystem of the SoC crashing a first time, taking one or more ISSR steps to cause the first subsystem to recover from the crash, as indicated by block 202.

Figure 3:
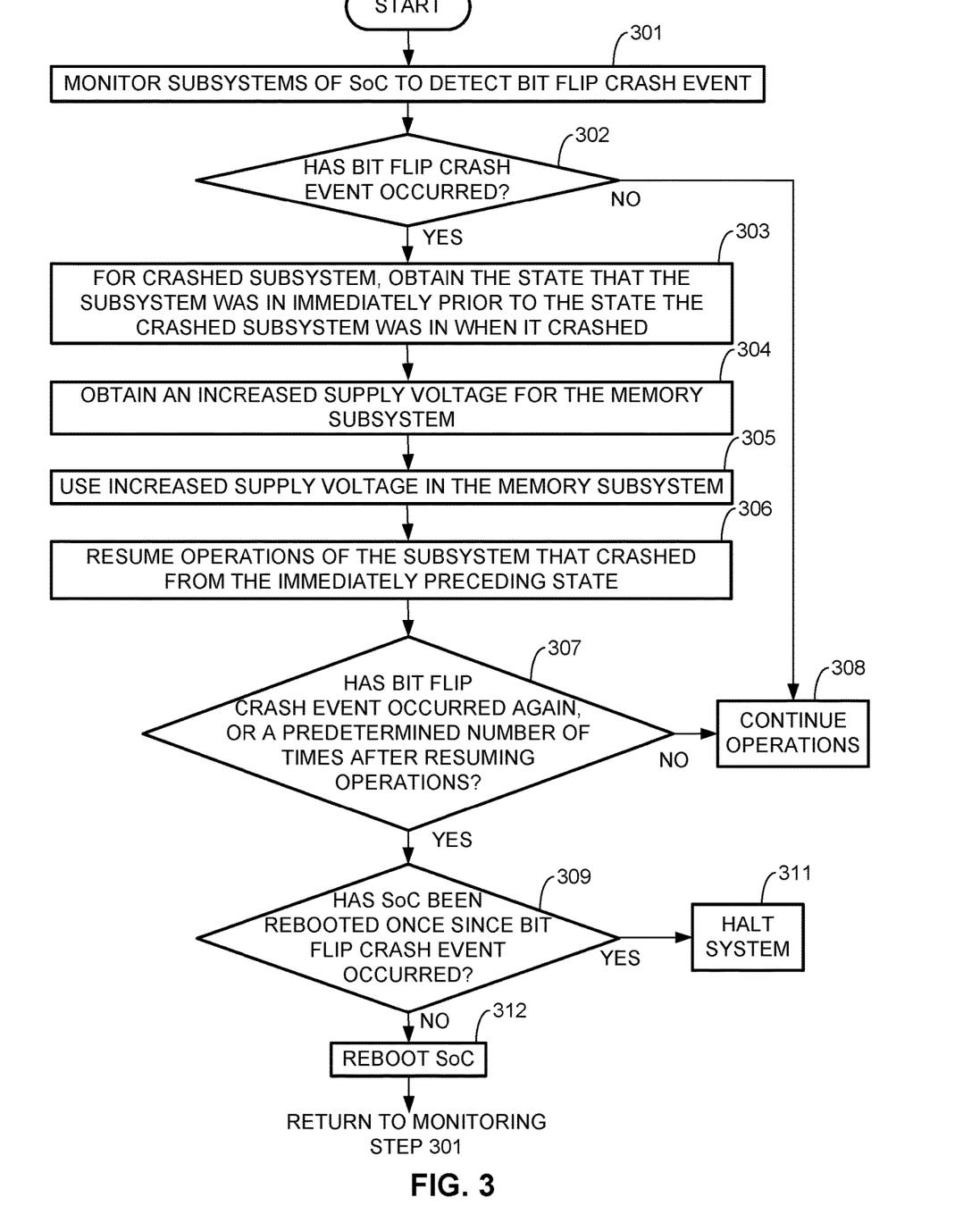
FIG. 3 is a flow diagram depicting the ISSR method in accordance with another representative embodiment.

There are several ways that the method represented by the flow diagram of FIG. 2 can be performed. FIG. 3 is a flow diagram depicting the ISSR method in accordance with a representative embodiment in which specific ISSR steps are taken to recover the crashed subsystem. The ISSR engine 120 monitors the performance of the subsystems $150_1$-$150_N$, as indicated by block 301. While monitoring the subsystems $150_1$-$150_N$, the ISSR engine 120 determines when any of the subsystems $120$-$150_N$ has entered a crash state indicating that the subsystem has crashed due to bit flip error, as indicated by block 302. If not, the process proceeds to block 308 and mission mode operations continue. If the ISSR engine 120 determines that a subsystem has crashed due to a bit flip event, then it obtains the previous state that the crashed subsystem was in just prior to the crash, as indicated by block 303. The ISSR engine 120 then requests that the PMIC 170 provide an increased supply voltage for the memory subsystem 140, as indicated by block 304.

As indicated above, the increase in the supply voltage can be an incremental, or stepwise, increase in the supply voltage above the supply voltage that was being used by the memory subsystem 140 when the crash occurred.

The memory subsystem 140 then begins using the increased supply voltage, as indicated by block 305. The ISSR engine 120 causes the state that the crashed subsystem was in just prior to the state that the crashed subsystem was in when it crashed to be restored and for the operations of the subsystem to resume from the prior state using the increased supply voltage, as indicated by block 306.

After resuming operations, the ISSR engine 120 determines whether the crash occurs again, or occurs a predetermined number of times, when using the increased supply voltage, as indicated by block 307. If not, the process proceeds to block 308 and mission mode operations continue.

As indicated above, the process of increasing the supply voltage in a stepwise manner, restoring the previous state of the subsystem (i.e., the state just prior to the crash state), resuming subsystem operations in the previous state, and observing whether the subsystem recovers can occur once or it can be an iterative process performed some predetermined number of times, depending on the manner in which the ISSR engine 120 and method are implemented.

If the subsystem fails to recover after one or some predetermined number of recovery attempts, the ISSR engine 120 determines at block 309 whether or not the SoC 110 has been rebooted once since proceeding from block 307 to block 309. If not, the SoC 110 is rebooted, as indicated by block 312, and the process returns to the monitoring step of block 301. If the ISSR engine 120 determines at block 309 that the SoC 110 has already been rebooted once, the ISSR engine 120 causes operations of the SoC 110 to be halted, as indicated by block 311.

As indicated above, the ISSR engine 120 preferably logs the occurrence of the crash event, the state that the crashed subsystem was in when the crash occurred, the number of recovery attempts that were made, and sends feedback to the OEM. The ISSR engine 120 can also cause one or more other actions to be taken.

Figure 4:
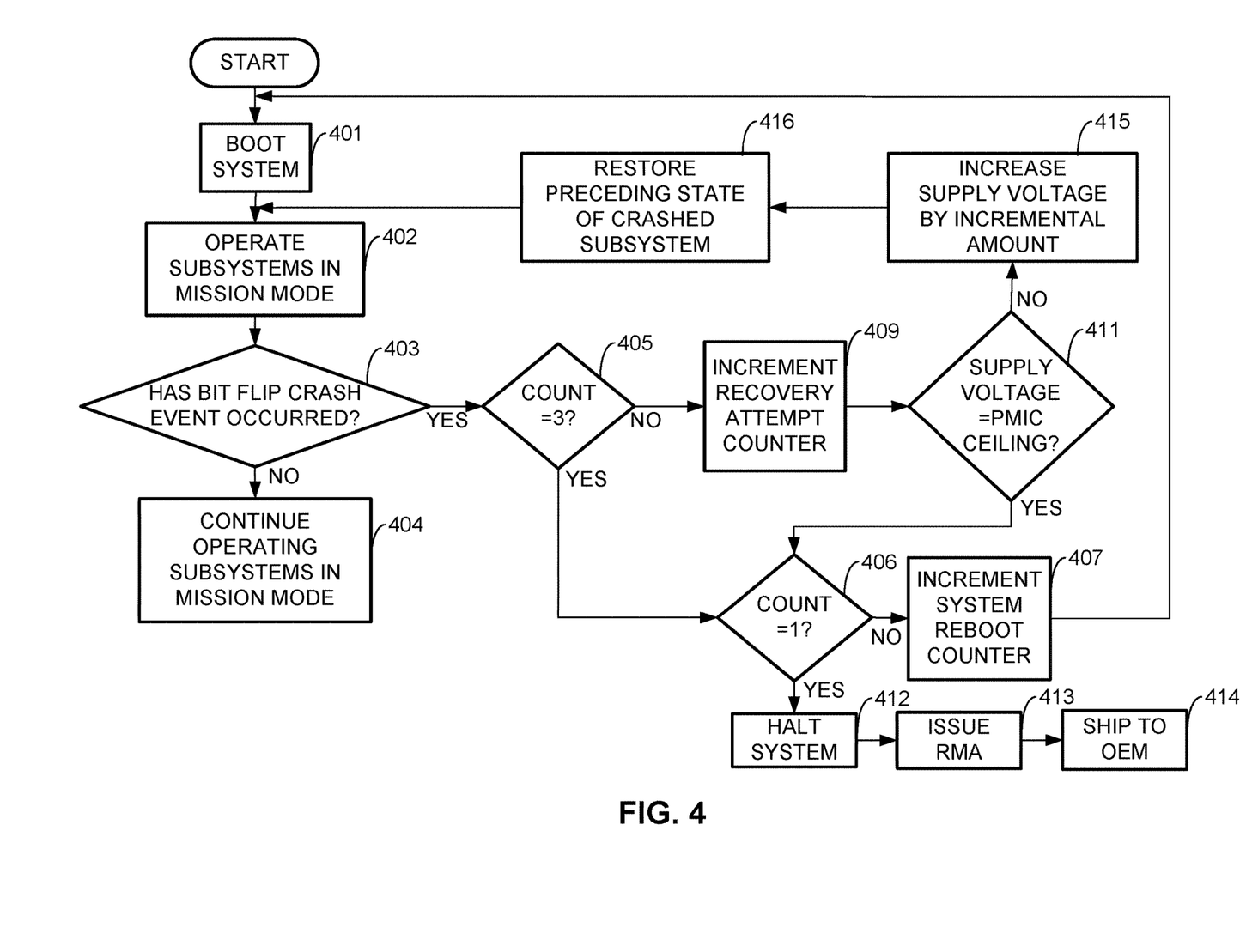
FIG. 4 is a flow diagram depicting the ISSR method in accordance with another representative embodiment.

FIG. 4 is a flow diagram depicting the ISSR method in accordance with another representative embodiment in which specific ISSR steps are taken to recover the crashed subsystem. In accordance with this representative embodiment, the ISSR engine 120 starts monitoring the subsystems of the SoC when the SoC is booted up, as indicated by block 401. Block 402 represents the subsystems of the SoC performing their normal mission mode operations. While the subsystems are performing mission mode operations, the ISSR engine 120 monitors them and determines when any of the subsystems has entered a crash state indicating that the subsystem has crashed due to bit flip error, as indicated by block 403. If not, the process proceeds to block 404 and mission mode operations continue to be performed.

In accordance with this representative embodiment, the ISSR engine 120 performs a maximum of three recovery attempts followed by a system reboot of the SoC if the three recovery attempts fail. For this purpose, the ISSR engine 120 uses a recovery attempt counter that increments by one each time the supply voltage is increased and operations of the crashed subsystem are restored using the state of the crashed subsystem that preceded the state when it crashed. The count has an initial value of zero. Block 405 represents the ISSR engine 120 determining whether the recovery process has been performed three times by determining whether the count is equal to 3.

If so, the process proceeds to block 406. If three recovery attempts have been made by increasing the supply voltage three times and resuming operations to determine whether the increased supply voltage resulted in recovery of the subsystem, then the process proceeds to block 406 to determine whether a reboot counter has been incremented from zero to one. If the three recovery attempts are unsuccessful, then the ISSR engine 120 causes the SoC to be rebooted one time by returning the process to block 401. When the reboot occurs, the system reboot counter is incremented by one at block 407. If the process returns to block 406 a second time, then the process will proceed to block 412 at which the SoC is halted, and optionally to blocks 413 and 414 at which an RMA is issued and the SoC is returned to the OEM, respectively.

If the ISSR engine 120 determines at block 405 that the recovery attempt counter has not yet been incremented to three, the process proceeds to block 409 at which the recovery attempt counter is incremented by one. The process then proceeds to block 411 at which a determination is made as to whether the supply voltage is already at the ceiling of the PMIC 170, i.e., at the maximum value that the supply voltage of the memory subsystem 140 can have. Different supply voltage domains of the SoC have different maximum values that are typically based on the product specification. The PMIC ceiling used at block 411 is the maximum value for the supply voltage of the memory subsystem 140.

If the answer at block 411 is yes, the process proceeds to block 406 described above. Otherwise, the supply voltage is increased incrementally, e.g., in steps of 10 millivolt (mV), at block 415, the immediately preceding state of the subsystem is restored at block 416 and mission mode operations are resumed at block 402.

The process represented by the flow diagram of FIG. 4 is iteratively performed until the crashed subsystem is recovered, either through one to three recovery attempts or a system reboot, or the system is halted. The primary advantage of the system and method of the present disclosure over existing solutions is that existing solutions halt the system when a bit flip crash is detected, issue a RMA and ship the product to the OEM for debugging, whereas the solution of the present disclosure has the potential to recover the crashed subsystem without halting the system. This results in fewer RMAs being issued, fewer returns to the OEM, enhanced end user quality of experience/service (QoE/QoS), and reduced latency of subsystem functionality during a crash scenario.

Another advantage of the solution of the present disclosure is that it enables in-field diagnostics to be performed. Preferably, each time a bit flip crash event is detected at block 403, the ISSR engine 120 logs the event and details about the event and periodically provides the log as feedback to the OEM. This feature allows the OEM to anticipate possible failures and take steps to avoid design and/or manufacturing errors in new products prior to shipment to customers.

Figure 5:
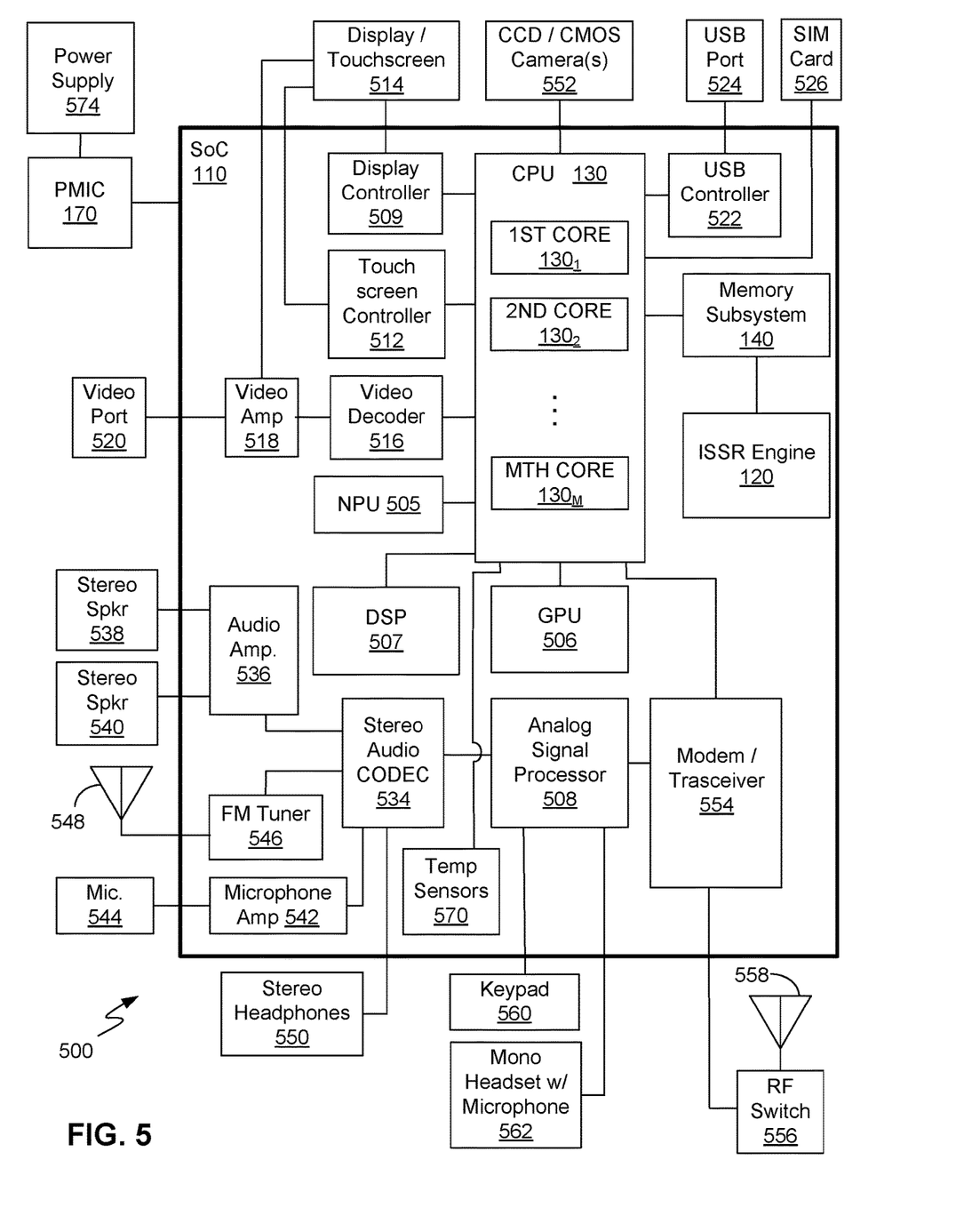
FIG. 5 is a block diagram of a personal computing device (PCD) in accordance with a representative embodiment that incorporates the ISSR system shown in FIG. 1 or similar systems.

FIG. 5 illustrates an example of a PCD 500, such as a mobile phone or a smartphone, for example, in which exemplary embodiments of systems, methods, computer-readable media, and other examples of the inventive principles and concepts of the present disclosure may be implemented. The PCD 500 comprises the system 100 shown in FIG. 1 or a similar system, which comprises the SoC 110 shown in FIG. 1. For purposes of clarity, some interconnects, signals, the bus 160 (FIG. 1), etc., are not shown in FIG. 5.

As indicated above, The SoC 110 may include a variety of subsystems, such as CPU 130, an NPU 505, a GPU 506, a DSP 507, an analog signal processor 508, a modem/transceiver 554, or other processors. The CPU 130 may include one or more CPU cores, such as a first CPU core $130_1$, a second CPU core $130_2$, etc., through an $M^{th}$ CPU core $130_M$.

A display controller 509 and a touch-screen controller 512 may be coupled to the CPU 130. A touchscreen display 514 external to the SoC 110 may be coupled to the display controller 509 and the touch-screen controller 512. The PCD 500 may further include a video decoder 516 coupled to the CPU 130. A video amplifier 518 may be coupled to the video decoder 516 and the touchscreen display 514. A video port 520 may be coupled to the video amplifier 518. A universal serial bus ("USB") controller 522 may also be coupled to CPU 130, and a USB port 524 may be coupled to the USB controller 522. A subscriber identity module ("SIM") card 526 may also be coupled to the CPU 130.

One or more memories may be coupled to the CPU 130, including the memory subsystem 140. The one or more memories may include both volatile and non-volatile memories. Examples of volatile memories include static random access memory ("SRAM") and dynamic random access memory ("DRAM"). The one or more memories may include local cache memory or a system-level cache memory.

A stereo audio CODEC 534 may be coupled to the analog signal processor 508. Further, an audio amplifier 536 may be coupled to the stereo audio CODEC 534. First and second stereo speakers 538 and 540, respectively, may be coupled to the audio amplifier 536. In addition, a microphone amplifier 542 may be coupled to the stereo audio CODEC 534, and a microphone 544 may be coupled to the microphone amplifier 542. A frequency modulation ("FM") radio tuner 546 may be coupled to the stereo audio CODEC 534. An FM antenna 548 may be coupled to the FM radio tuner 546. Further, stereo headphones 550 may be coupled to the stereo audio CODEC 534. Other devices that may be coupled to the CPU 130 include one or more digital (e.g., CCD or CMOS) cameras 552.

The modem/transceiver 554 may be coupled to the analog signal processor 508 and the CPU 130. An RF switch 556 may be coupled to the modem/transceiver 554 and an RF antenna 558. In addition, a keypad 560 and a mono headset with a microphone 562 may be coupled to the analog signal processor 508. The SoC 110 may have one or more internal or on-chip thermal sensors 570. A power supply 574 and the PMIC 170 may supply power to the SoC 110.

Firmware or software may be stored in any of the above-described memories, or may be stored in a local memory directly accessible by the processor hardware on which the software or firmware executes. Execution of such firmware or software by logic of the CPU 130 may control aspects of any of the above-described methods or configure aspects of any of the above-described systems. Any such memory or other non-transitory storage medium having firmware or software stored therein in computer-readable form for execution by processor hardware may be an example of a "computer-readable medium," as the term is understood in the patent lexicon.

Figure 6:
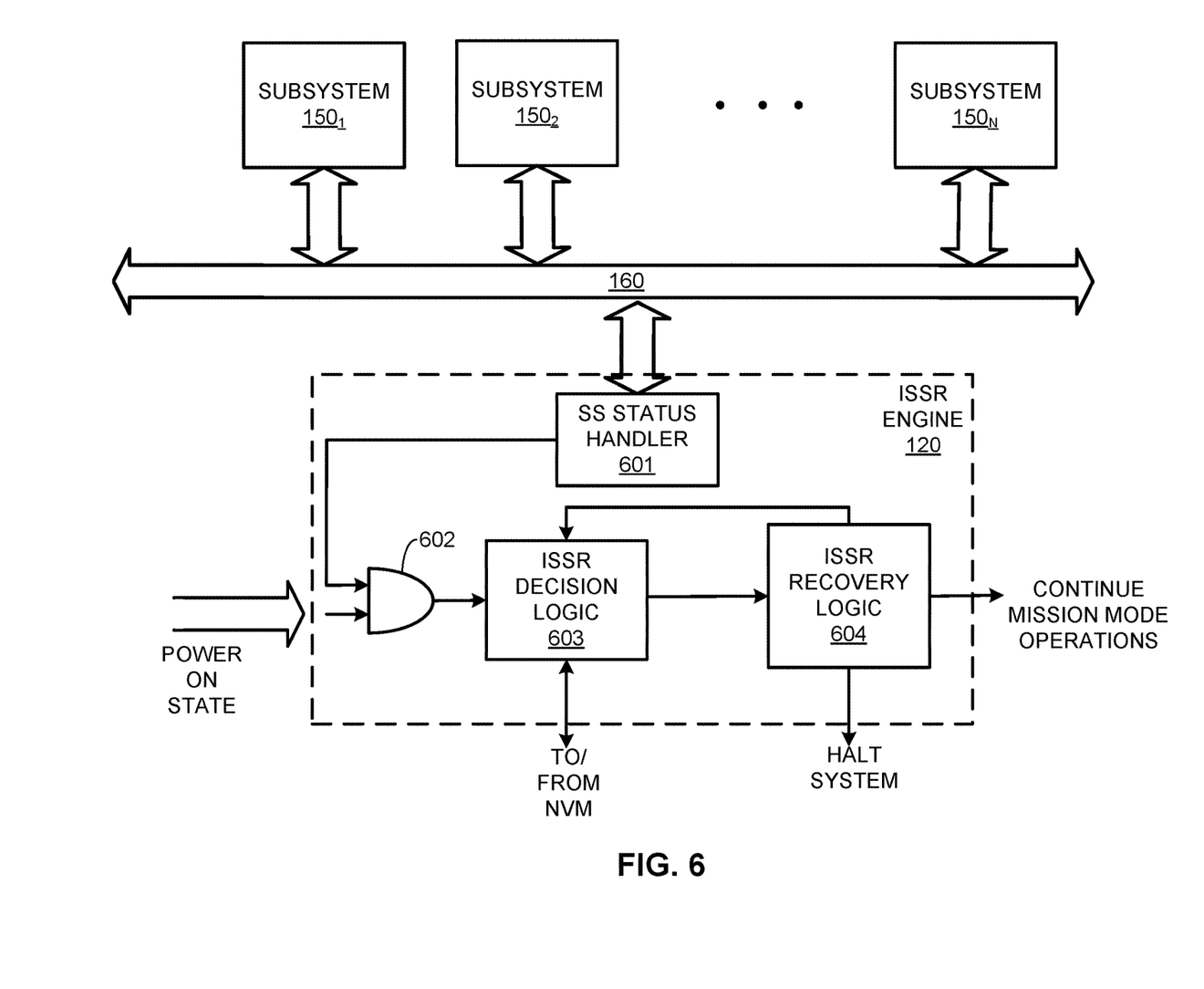
FIG. 6 is a block diagram of the ISSR engine shown in FIG. 1 in accordance with a representative embodiment.

FIG. 6 is a block diagram of the ISSR engine 120 shown in FIG. 1 in accordance with a representative embodiment. The ISSR engine 120 can be implemented in several ways, as will be understood by those of skill in the art in view of the description provided herein. The block diagram of the ISSR engine 120 shown in FIG. 6 is an example of one of a plurality of possible implementation scenarios for the ISSR engine 120.

A status handler 601 of the ISSR engine 120 is configured to monitor the subsystems $150_1$-$150_N$ and detect when any of the subsystems $150_1$-$150_N$ has experienced a crash event, i.e., has halted operations. When the SoC 110 is in the power-on state and the status handler 601 detects that one of the subsystems $150_1$-$150_N$ has crashed, AND gate logic 602 asserts a bit that is output to ISSR decision logic 603.

When the ISSR decision logic 603 receives the asserted bit from the AND gate logic 602, it begins performing the decision processes described above with reference to blocks 302, 307 and 309 of FIG. 3 and blocks 403, 405, 406 and 411 of FIG. 4. The ISSR decision logic 603 also communicates with NVM (e.g., NVM of memory subsystem 140 or NVM of the ISSR engine 120) to ascertain the state of the last write or read operation that was performed by the subsystem before it crashed and to obtain the state that the subsystem was in immediately preceding the crash event in order to resume subsystem operations in a recovery attempt. The ISSR decision logic 603 includes logic that compares the last bit that was written to or read from NVM to determine whether the bit value is the same as the expected bit value, and if not, triggers ISSR recovery logic 604 of the ISSR engine 120 to take one or more of the recovery steps described above with reference to FIGS. 2-4.

The ISSR recovery logic 604 of the ISSR engine 120 receives output signals from the ISSR decision logic 603 and processes those output signals to determine which ISSR recovery steps to perform. The ISSR recovery logic 604 performs the steps represented by blocks 304-306, 308, 311 and 312 of FIG. 3 and the steps represented by blocks 404, 409, and 412-416 of FIG. 4 to perform recovery steps and resume mission mode operations or halts the SoC if the recovery steps are unsuccessful.

Implementation examples are described in the following numbered clauses:

1. A method for in-system, self-recovery (ISSR) of subsystems of a system-on-a-chip (SoC) if a bit corruption event occurs during operations of one of the subsystems, the method comprising:
    determining whether a bit corruption event has occurred resulting in one of the subsystems of the SoC crashing; and
    taking one or more ISSR steps to cause the first subsystem to recover from the crash in response to a determination that a bit corruption event has occurred resulting in a first subsystem of the SoC crashing a first time.

2. The method of clause 1, further comprising:
    determining whether taking said one or more ISSR steps was successful at causing the first subsystem to recover from the crash; and
    continuing operations of the first subsystem without halting operations of the SoC in response to a determination that taking said one or more ISSR steps was successful at causing the first subsystem to recover from the crash.

3. The method of any of clauses 1-2, further comprising:
    halting operations of the SoC in response to a determination that taking said one or more ISSR steps was unsuccessful at causing the first subsystem to recover from the crash.

4. The method of any of clauses 1-3, wherein said one or more ISSR steps include:
    increasing a supply voltage of a memory subsystem of the SoC from a first supply voltage value to a second supply voltage value that is greater than the first supply voltage value;
    restoring a state of the first subsystem to a first state that the first subsystem was in immediately preceding a second state that the first subsystem was in when the first subsystem crashed; and
    resuming operations of the first subsystem from the restored first state.

5. The method of clause 4, wherein said one or more ISSR steps further include:
    after resuming operations of the first subsystem from the restored first state, determining whether a bit corruption event has occurred resulting in the first subsystem crashing a second time.

6. The method of clause 5, wherein said one or more ISSR steps further include:
    in response to a determination a bit corruption event has occurred resulting in the first subsystem crashing a second time:
    increasing the supply voltage of the memory subsystem from the second supply voltage value to a third supply voltage value that is greater than the second supply voltage value;
    restoring a state of the first subsystem to a third state that the first subsystem was in immediately preceding a fourth state that the first subsystem was in when the first subsystem crashed the second time; and
    resuming operations of the first subsystem from the restored third state.

7. The method of clause 6, wherein said one or more ISSR steps further include:
    after resuming operations of the first subsystem from the restored third state, determining whether a bit corruption event has occurred resulting in the first subsystem crashing a third time;
    in response to a determination that a bit corruption event has occurred resulting in the first subsystem of the SoC crashing a third time:
    determining whether a fourth supply voltage value exceeds a maximum supply voltage ceiling for the memory subsystem, and if not, increasing the supply voltage of the memory subsystem from the third supply voltage value to the fourth supply voltage value, the fourth supply voltage value being greater than the third supply voltage value;
    restoring a state of the first subsystem to a fifth state that the first subsystem was in immediately preceding a sixth state that the first subsystem was in when the first subsystem crashed the third time; and
    resuming operations of the first subsystem from the restored fifth state.

8. The method of clause 7, wherein said one or more ISSR steps further include:
    after resuming operations of the first subsystem from the restored fifth state, determining whether a bit corruption event has occurred resulting in the first subsystem crashing a fourth time; and
    in response to a determination that a bit corruption event has occurred resulting in the first subsystem of the SoC crashing a fourth time:
    rebooting the SoC.

9. The method of clause 8, wherein said one or more ISSR steps further include:
    after rebooting the SoC, determining whether a bit corruption event has occurred resulting in the first subsystem crashing a fifth time; and
    in response to a determination that a bit corruption event has occurred resulting in a first subsystem of the SoC crashing a fifth time, taking one or more ISSR steps to cause the first subsystem to recover from the crash of the fifth time.

10. The method of clause 9, further comprising:
    determining whether taking said one or more ISSR steps was successful at causing the first subsystem to recover from the crash of the fifth time;
    in response to a determination that taking said one or more ISSR steps was successful at causing the first subsystem to recover from the crash of the fifth time, continuing operations of the first subsystem; and
    in response to a determination that taking said one or more ISSR steps was successful at causing the first subsystem to recover from the crash of the fifth time, halting operations of the SoC.

11. An in-system, self-recovery (ISSR) system of a system-on-a-chip (SoC) for performing in-system, self-recovery of a subsystem of the SoC if a bit corruption event occurs during operations of one of the subsystems of the SoC, the ISSR system comprising:
    an ISSR engine in communication with the subsystems of the SoC, the ISSR engine comprising:

ISSR decision logic configured to determine whether a bit corruption event has occurred resulting in one of the subsystems of the SoC crashing; and ISSR recovery logic configured to cause one or more ISSR steps to be taken if a determination is made that a bit corruption event has occurred resulting in a first subsystem of the SoC crashing a first time, wherein said one or more ISSR steps to be taken are intended to recover the first subsystem from the crash.

12. The ISSR system of clause 11, wherein the ISSR logic is further configured to cause operations of the first subsystem to continue to be performed in response to determining that taking said one or more ISSR steps was successful at causing the first subsystem to recover from the crash.

13. The ISSR system of any of clauses 11-12, wherein the ISSR recovery logic is further configured to halt operations of the SoC in response to determining that taking said one or more ISSR steps was unsuccessful at causing the first subsystem to recover from the crash.

14. The ISSR system of any of clauses 11-13, wherein said one or more ISSR steps that the ISSR recovery logic is configured to take include:
   increasing a supply voltage of a memory subsystem of the SoC from a first supply voltage value to a second supply voltage value that is greater than the first supply voltage value;
   restoring a state of the first subsystem to a first state that the first subsystem was in immediately preceding a second state that the first subsystem was in when the first subsystem crashed; and
   resuming operations of the first subsystem from the restored first state.

15. The ISSR system of clause 14, wherein said one or more ISSR steps that the ISSR recovery logic is configured to take further include:
   after resuming operations of the first subsystem from the restored first state, determining whether a bit corruption event has occurred resulting in the first subsystem crashing a second time; and
   after resuming operations of the first subsystem from the restored first state, in response to determining that a bit corruption event has not occurred resulting in the first subsystem crashing a second time, causing the first subsystem to continue performing mission mode operations.

16. The ISSR system of any of clauses 15-16, wherein said one or more ISSR steps that the ISSR recovery logic is configured to take further include:
   after resuming operations of the first subsystem from the restored first state, in response to determining that a bit corruption event has occurred resulting in the first subsystem crashing a second time:
   increasing the supply voltage of the memory subsystem from the second supply voltage value to a third supply voltage value that is greater than the second supply voltage value;
   restoring a state of the first subsystem to a third state that the first subsystem was in immediately preceding a fourth state that the first subsystem was in when the first subsystem crashed the second time; and
   resuming operations of the first subsystem from the restored third state.

17. The ISSR system of clause 16, wherein said one or more ISSR steps that the ISSR recovery logic is configured to take further include:
   after resuming operations of the first subsystem from the restored third state, determining whether a bit corruption event has occurred resulting in the first subsystem crashing a third time;
   after resuming operations of the first subsystem from the restored third state, in response to determining that a bit corruption event has occurred resulting in the first subsystem of the SoC crashing a third time:
   determining whether a fourth supply voltage value exceeds a maximum supply voltage ceiling for the memory subsystem, and if not, increasing the supply voltage of the memory subsystem from the third supply voltage value to the fourth supply voltage value, the fourth supply voltage value being greater than the third supply voltage value;
   restoring a state of the first subsystem to a fifth state that the first subsystem was in immediately preceding a sixth state that the first subsystem was in when the first subsystem crashed the third time; and
   resuming operations of the first subsystem from the restored fifth state.

18. The ISSR system of clause 17, wherein said one or more ISSR steps that the ISSR recovery logic is configured to take further include:
   after resuming operations of the first subsystem from the restored fifth state, determining whether a bit corruption event has occurred resulting in the first subsystem crashing a fourth time; and
   after resuming operations of the first subsystem from the restored fifth state, in response to determining that a bit corruption event has occurred resulting in the first subsystem of the SoC crashing a fourth time:
   rebooting the SoC.

19. The ISSR system of clause 18, wherein said one or more ISSR steps that the ISSR recovery logic is configured to take further include:
   after rebooting the SoC, determining whether a bit corruption event has occurred resulting in the first subsystem crashing a fifth time;
   in response to a determination that a bit corruption event has occurred resulting in a first subsystem of the SoC crashing a fifth time, taking one or more ISSR steps to cause the first subsystem to recover from the crash of the fifth time;
   in response to determining that taking said one or more ISSR steps was successful at causing the first subsystem to recover from the crash of the fifth time, continuing mission mode operations of the first subsystem; and
   in response to determining that taking said one or more ISSR steps was unsuccessful at causing the first subsystem to recover from the crash of the fifth time, halting operations of the SoC.

20. A computer program embodied on a non-transitory computer readable medium for execution by an in-system, self-recovery (ISSR) engine of a system-on-a-chip (SoC) for performing in-system, self-recovery of a subsystem of the SoC if a bit corruption event occurs during operations of one of the subsystems of the SoC, the computer program comprising:
   a first set of computer instructions for causing the ISSR engine to determine whether a bit corruption event has occurred resulting in one of the subsystems of the SoC crashing; and
   a second set of computer instructions for causing the ISSR engine to take one or more ISSR steps to cause a first subsystem of the SoC to recover from the crash in response to a determination being made by the first set of computer instructions that a bit corruption event has occurred resulting in a first subsystem of the SoC crashing.

Alternative embodiments will become apparent to one of ordinary skill in the art to which the invention pertains in view of the present disclosure. Therefore, although selected aspects have been illustrated and described in detail, it will be understood that various substitutions and alterations may be made therein.

What is claimed is:

1. A method for in-system, self-recovery (ISSR) of subsystems of a system-on-a-chip (SoC) if a bit corruption event occurs during operations of one of the subsystems, the method comprising:
    determining whether a bit corruption event has occurred resulting in one of the subsystems of the SoC crashing;
    taking one or more ISSR steps to cause a first subsystem to recover from the crash in response to a determination that a bit corruption event has occurred resulting in the first subsystem of the SoC crashing a first time;
    determining whether taking said one or more ISSR steps was successful at causing the first subsystem to recover from the crash;
    continuing operations of the first subsystem without halting operations of the SoC in response to a determination that taking said one or more ISSR steps was successful at causing the first subsystem to recover from the crash;
    wherein said one or more ISSR steps include:
        increasing a supply voltage of a memory subsystem of the SoC from a first supply voltage value to a second supply voltage value that is greater than the first supply voltage value;
        restoring a state of the first subsystem to a first state that the first subsystem was in immediately preceding a second state that the first subsystem was in when the first subsystem crashed; and
        resuming operations of the first subsystem from the restored first state.

2. The method of claim 1, further comprising:
    halting operations of the SoC in response to a determination that taking said one or more ISSR steps was unsuccessful at causing the first subsystem to recover from the crash.

3. The method of claim 1, wherein said one or more ISSR steps further include:
    after resuming operations of the first subsystem from the restored first state, determining whether a bit corruption event has occurred resulting in the first subsystem crashing a second time.

4. The method of claim 3, wherein said one or more ISSR steps further include:
    in response to a determination a bit corruption event has occurred resulting in the first subsystem crashing a second time:
        increasing the supply voltage of the memory subsystem from the second supply voltage value to a third supply voltage value that is greater than the second supply voltage value;
        restoring a state of the first subsystem to a third state that the first subsystem was in immediately preceding a fourth state that the first subsystem was in when the first subsystem crashed the second time; and
        resuming operations of the first subsystem from the restored third state.

5. The method of claim 4, wherein said one or more ISSR steps further include:
    after resuming operations of the first subsystem from the restored third state, determining whether a bit corruption event has occurred resulting in the first subsystem crashing a third time;
    in response to a determination that a bit corruption event has occurred resulting in the first subsystem of the SoC crashing a third time:
        determining whether a fourth supply voltage value exceeds a maximum supply voltage ceiling for the memory subsystem, and if not, increasing the supply voltage of the memory subsystem from the third supply voltage value to the fourth supply voltage value, the fourth supply voltage value being greater than the third supply voltage value;
        restoring a state of the first subsystem to a fifth state that the first subsystem was in immediately preceding a sixth state that the first subsystem was in when the first subsystem crashed the third time; and
        resuming operations of the first subsystem from the restored fifth state.

6. The method of claim 5, wherein said one or more ISSR steps further include:
    after resuming operations of the first subsystem from the restored fifth state, determining whether a bit corruption event has occurred resulting in the first subsystem crashing a fourth time; and
    in response to a determination that a bit corruption event has occurred resulting in the first subsystem of the SoC crashing a fourth time:
    rebooting the SoC.

7. The method of claim 6, wherein said one or more ISSR steps further include:
    after rebooting the SoC, determining whether a bit corruption event has occurred resulting in the first subsystem crashing a fifth time; and
    in response to a determination that a bit corruption event has occurred resulting in a first subsystem of the SoC crashing a fifth time, taking one or more ISSR steps to cause the first subsystem to recover from the crash of the fifth time.

8. The method of claim 7, further comprising:
    determining whether taking said one or more ISSR steps was successful at causing the first subsystem to recover from the crash of the fifth time;
    in response to a determination that taking said one or more ISSR steps was successful at causing the first subsystem to recover from the crash of the fifth time, continuing operations of the first subsystem; and
    in response to a determination that taking said one or more ISSR steps was successful at causing the first subsystem to recover from the crash of the fifth time, halting operations of the SoC.

9. An in-system, self-recovery (ISSR) system of a system-on-a-chip (SoC) for performing in-system, self-recovery of subsystems of the SoC if a bit corruption event occurs during operations of one of the subsystems of the SoC, the ISSR system comprising:
    an ISSR engine in communication with the subsystems of the SoC, the ISSR engine comprising:
        ISSR decision logic configured to determine whether a bit corruption event has occurred resulting in one of the subsystems of the SoC crashing;
        ISSR recovery logic configured to cause one or more ISSR steps to be taken if a determination is made that a bit corruption event has occurred resulting in a first subsystem of the SoC crashing a first time, wherein said one or more ISSR steps to be taken are intended to recover the first subsystem from the crash;

wherein the ISSR recovery logic is further configured to cause operations of the first subsystem to continue to be performed in response to determining that taking said one or more ISSR steps was successful at causing the first subsystem to recover from the crash;

wherein said one or more ISSR steps that the ISSR recovery logic is configured to take include:
 increasing a supply voltage of a memory subsystem of the SoC from a first supply voltage value to a second supply voltage value that is greater than the first supply voltage value;
 restoring a state of the first subsystem to a first state that the first subsystem was in immediately preceding a second state that the first subsystem was in when the first subsystem crashed; and
 resuming operations of the first subsystem from the restored first state.

10. The ISSR system of claim 9, wherein the ISSR recovery logic is further configured to halt operations of the SoC in response to determining that taking said one or more ISSR steps was unsuccessful at causing the first subsystem to recover from the crash.

11. The ISSR system of claim 9, wherein said one or more ISSR steps that the ISSR recovery logic is configured to take further include:
 after resuming operations of the first subsystem from the restored first state, determining whether a bit corruption event has occurred resulting in the first subsystem crashing a second time; and
 after resuming operations of the first subsystem from the restored first state, in response to determining that a bit corruption event has not occurred resulting in the first subsystem crashing a second time, causing the first subsystem to continue performing operations.

12. The ISSR system of claim 11, wherein said one or more ISSR steps that the ISSR recovery logic is configured to take further include:
 after resuming operations of the first subsystem from the restored first state, in response to determining that a bit corruption event has occurred resulting in the first subsystem crashing a second time:
  increasing the supply voltage of the memory subsystem from the second supply voltage value to a third supply voltage value that is greater than the second supply voltage value;
  restoring a state of the first subsystem to a third state that the first subsystem was in immediately preceding a fourth state that the first subsystem was in when the first subsystem crashed the second time; and
  resuming operations of the first subsystem from the restored third state.

13. The ISSR system of claim 12, wherein said one or more ISSR steps that the ISSR recovery logic is configured to take further include:
 after resuming operations of the first subsystem from the restored third state, determining whether a bit corruption event has occurred resulting in the first subsystem crashing a third time;
 after resuming operations of the first subsystem from the restored third state, in response to determining that a bit corruption event has occurred resulting in the first subsystem of the SoC crashing a third time:
  determining whether a fourth supply voltage value exceeds a maximum supply voltage ceiling for the memory subsystem, and if not, increasing the supply voltage of the memory subsystem from the third supply voltage value to the fourth supply voltage value, the fourth supply voltage value being greater than the third supply voltage value;
  restoring a state of the first subsystem to a fifth state that the first subsystem was in immediately preceding a sixth state that the first subsystem was in when the first subsystem crashed the third time; and
  resuming operations of the first subsystem from the restored fifth state.

14. The ISSR system of claim 13, wherein said one or more ISSR steps that the ISSR recovery logic is configured to take further include:
 after resuming operations of the first subsystem from the restored fifth state, determining whether a bit corruption event has occurred resulting in the first subsystem crashing a fourth time; and
 after resuming operations of the first subsystem from the restored fifth state, in response to determining that a bit corruption event has occurred resulting in the first subsystem of the SoC crashing a fourth time:
  rebooting the SoC.

15. The ISSR system of claim 14, wherein said one or more ISSR steps that the ISSR recovery logic is configured to take further include:
 after rebooting the SoC, determining whether a bit corruption event has occurred resulting in the first subsystem crashing a fifth time;
 in response to a determination that a bit corruption event has occurred resulting in a first subsystem of the SoC crashing a fifth time, taking one or more ISSR steps to cause the first subsystem to recover from the crash of the fifth time;
 in response to determining that taking said one or more ISSR steps was successful at causing the first subsystem to recover from the crash of the fifth time, continuing operations of the first subsystem; and
 in response to determining that taking said one or more ISSR steps was unsuccessful at causing the first subsystem to recover from the crash of the fifth time, halting operations of the SoC.

16. A non-transitory computer readable medium for execution by an in-system, self-recovery (ISSR) engine of a system-on-a-chip (SoC) for performing in-system, self-recovery of a subsystem of the SoC if a bit corruption event occurs during operations of one of the subsystems of the SoC, non-transitory computer readable medium comprising:
 a first set of computer instructions for causing the ISSR engine to determine whether a bit corruption event has occurred resulting in one of the subsystems of the SoC crashing;
 a second set of computer instructions for causing the ISSR engine to take one or more ISSR steps to cause a first subsystem of the SoC to recover from the crash in response to a determination being made by the first set of computer instructions that a bit corruption event has occurred resulting in the first subsystem of the SoC crashing; and
 a third set of computer instructions for causing the ISSR engine to continue to take the one or more ISSR steps in response to determining that taking said one or more ISSR steps was successful at causing the first subsystem to recover from the crash;
 wherein said one or more ISSR steps that cause the first subsystem of the SoC to recover from the crash include:

increasing a supply voltage of a memory subsystem of the SoC from a first supply voltage value to a second supply voltage value that is greater than the first supply voltage value;

restoring a state of the first subsystem to a first state that the first subsystem was in immediately preceding a second state that the first subsystem was in when the first subsystem crashed; and resuming operations of the first subsystem from the restored first state.

\* \* \* \* \*